No. 608,672. Patented Aug. 9, 1898.
J. HAMMOND.
SAFETY BRIDLE.
(Application filed Apr. 26, 1897.)
(No Model.)

Witnesses
Harry L. Amer.
Victor J. Evans.

Inventor
John Hammond.
By John Wedderburn.
Attorney

UNITED STATES PATENT OFFICE.

JOHN HAMMOND, OF BUENA VISTA, OHIO.

SAFETY-BRIDLE.

SPECIFICATION forming part of Letters Patent No. 608,672, dated August 9, 1898.

Application filed April 26, 1897. Serial No. 633,966. (No model.)

*To all whom it may concern:*

Be it known that I, JOHN HAMMOND, a citizen of the United States, residing at Buena Vista, in the county of Scioto and State of Ohio, have invented certain new and useful Improvements in Safety-Bridles; and I do hereby declare the following to be a full, clear, and exact description of the invention, such as will enable others skilled in the art to which it appertains to make and use the same.

This invention relates to safety-bridles for horses; and it consists, essentially, of devices for producing a compound throttling action during a bolt or abnormal action of the horse.

The invention further consists of the details of construction, arrangement, and combination of the several parts, which will be more fully hereinafter described and claimed.

The object of the present invention is to provide a safety-bridle that can be operated to shut off the wind of a fractious animal and prevent him from running away, and thereby avoiding accidents or injuring the life and limb of a driver or occupants of a vehicle.

Figure 1:
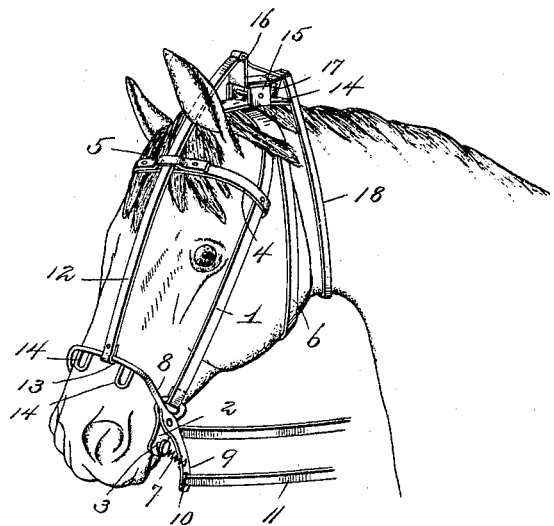
Figure 2:
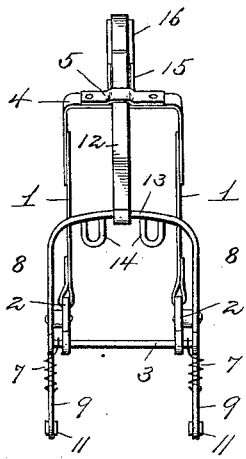
Figure 3:
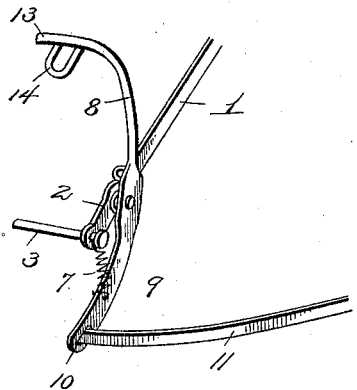

In the accompanying drawings, Figure 1 is a perspective view of the improved bridle shown applied in operative position. Fig. 2 is a front elevation of the improved bridle. Fig. 3 is a detail perspective view, on an enlarged scale, of a part of the device.

Referring to the drawings, wherein similar numerals of reference are employed to indicate corresponding parts in the several views, the numeral 1 designates the cheek-straps, connected at their lower ends, on opposite sides, to steel plates 2, which are in turn attached to the opposite ends of a bit 3. To the upper part of the said cheek-straps is secured the ordinary brow-band 4, having a loop 5 thereon. At the point where the cheek-straps cross over the top of the head of the animal a throat-latch 6 is secured in the ordinary manner. Attached to the opposite sides of the bit 3 are stiff springs 7, and pivotally mounted on the plates 2 are suitable metallic arms 8, having lower curved ends 9, to which the outer ends of the springs 7 are also connected. The lower terminating portions of the arms 8 are slotted, as at 10, to removably receive the front ends of driving-reins 11. A center strap 12 extends from the upper part of the bridle and downwardly and movably through the loop 5 of the brow-band 4 and has its lower end attached to a cross-arm 13, to the opposite portions of which the upper ends of the arms 8 are integrally formed or otherwise connected, and depending therefrom are wire or analogous fingers 14.

On the top of the bridle, at the point where the cheek-straps cross and become continuous with the throat-latch 6, a support 14 is positioned rigidly and has ears 15 projecting upwardly therefrom, pivotally embracing a bell-crank lever 16. A spring 17 is attached to the rear end of said lever and to the said support to normally hold the lever down.

The upper end of the center strap 12 is secured to the front arm of the lever 16, and to the rear arm of the latter is secured a choke-strap 18, which passes around the neck of the animal.

The operation of the device thus far described is simple and will be readily understood. Under ordinary circumstances the tension exerted on the reins 11 for guiding the animal will not operate the arms 8 through the interposition of the stiff springs 7; but should the animal become fractious or bolt and attempt to run away an extra tension or exertion applied to the reins will throw the arms 8 downwardly, as shown in dotted lines in Fig. 1, and move the fingers 14 over the nostrils, thereby shutting off the wind at this point, and simultaneously the central strap 12, drawing on the throat on the lever 16, will pull the choke-strap up and throttle the animal over the wind-pipe, it being understood, of course, that the parts have sufficient movement to accommodate the positioning of the fingers 14 in the manner specified. As soon as the animal finds that it is laborious for him to breathe it will of necessity curb his fractiousness and cause him to stop or cease his endeavors to run away. By this means an animal is rendered easily manageable by a very simple and effective attachment.

It will be understood that the springs 7 will tend to restore the devices to their normal position at the proper time, and it is obviously apparent that the parts may be suitably ornamented by plating or have other designs applied thereto.

Having thus described the invention, what is claimed as new is—

1. In a safety-bridle, the combination with the parts of the bridle, of plates attached thereto, a bit connected to said plates, arms pivotally mounted on said plates and having fingers in connection therewith to engage the nostrils of an animal, springs interposed between the opposite ends of the bit and the said arms, a throat-latch or choke-strap in connection with said arms, and reins attached to the lower ends of said arms, substantially as and for the purposes specified.

2. In a safety-bridle, the combination of a bit, movable nostril-closers, means for connecting said nostril-closers to the bit, driving-reins attached to said means, a choke-strap, and a center strap attached to the said nostril-closers and also connected to the choke-strap, substantially as described.

3. In a safety-bridle, the combination of a bit, a pair of arms movably attached to said bit, nostril-closers in connection with said arms, a center strap attached to said nostril-closers, an upper lever to which said center strap is also attached, a choke-strap connected to said lever, and driving-reins secured to said arms, substantially as described.

In testimony whereof I have signed this specification in the presence of two subscribing witnesses.

JOHN HAMMOND.

Witnesses:
ELLIS K. MCCALL,
J. L. BERKLEY.